July 29, 1952 J. C. BACKE 2,604,837
VENTILATION CONTROL MEANS FOR VEHICLES
Filed April 25, 1949
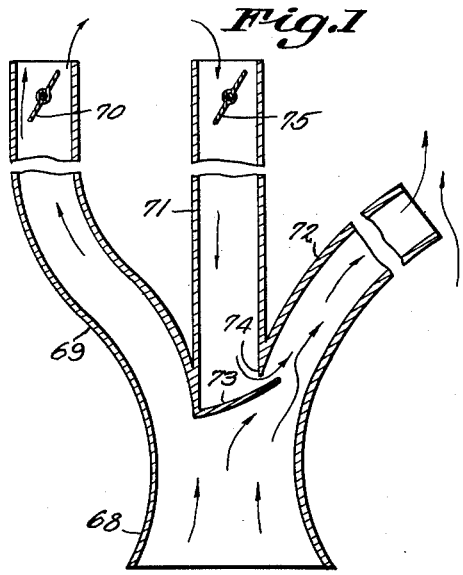
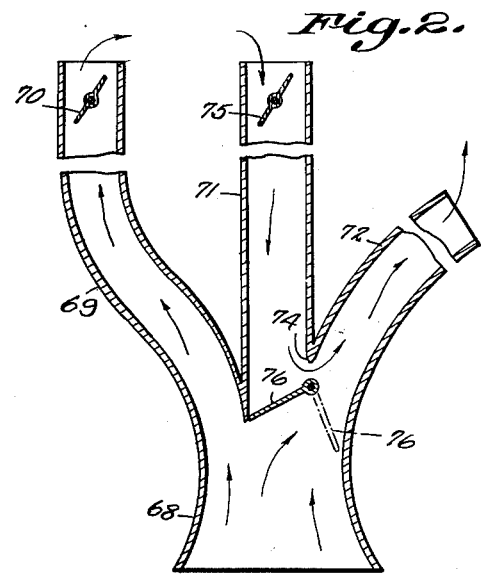
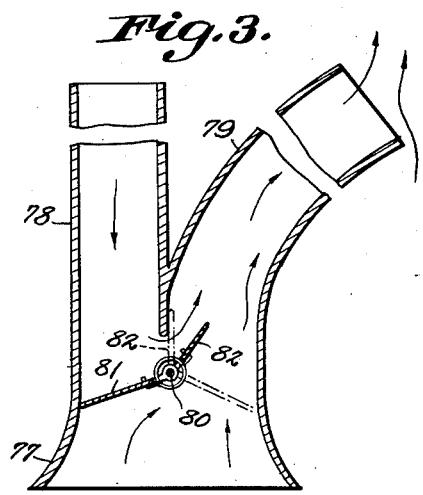
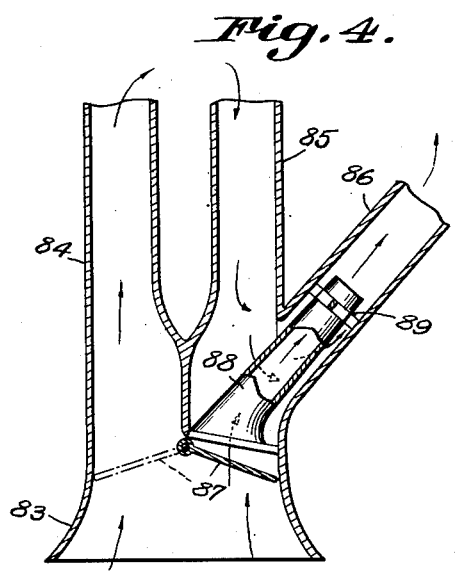
J.C.Backe
INVENTOR Patented July 29, 1952

2,604,837

UNITED STATES PATENT OFFICE 2,604,837

VENTILATION CONTROL MEANS FOR VEHICLES

John C. Backe, Gaylord, Mich.

Application April 25, 1949, Serial No. 89,525

1 Claim. (Cl. 98—2)

This invention relates to a ventilation control means for vehicles. More particularly, the invention has reference to a means of the character described adapted to control the admission and exhaustion of air, for proper ventilation of the vehicle interior.

An important object of the present invention is to provide a novel construction of a means of the character stated, whereby the fresh air can be admitted into the vehicle interior; used air exhausted from the vehicle interior; or fresh air can be admitted concurrently with the exhaustion of used air, in a controlled ratio.

Another important object is to provide a construction for a ventilating means of the type stated, adapted to be mounted within a vehicle at relatively low cost, while yet fulfilling efficiently the highly desirable objects of the invention.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Fig. 1 is a horizontal section through one form of this invention.

Fig. 2 is a view of the form of Fig. 1 with a modified valve.

Fig. 3 is a horizontal section through another form.

Fig. 4 is a horizontal section through another form.

Referring to the drawings in detail, in all instances the invention is adapted for mounting in a vehicle, such as an ordinary passenger automobile.

In the form of the invention illustrated in Fig. 1, an air scoop 68 is integrally formed with a main conduit 69 constituting an inlet duct, a secondary conduit 71 constituting an outlet duct, and an exhaust conduit 72. All these can be cast as one integral unit, and there can be attached to the respective ends of the members 69, 71, flexible hoses or the like if it is desired to extend the length of the conduits 69, 71.

In any event, in this form of the invention, I form integrally with the above mentioned members the deflecting shield 73, that prevents air from moving from the air scoop 68 into the secondary duct 71. However, said shield 73 does not close off the secondary conduit 71 entirely, but leaves a small opening 74, so disposed as to be acted upon by air rushing through the exhaust duct 72.

Closure members constituting butterflies 70 and 75 are respectively positioned within the inlet and outlet ducts for the purpose of closing either or both of said ducts.

Assuming that the valves 70, 75 are open, air scooped up by the intake 68 will be forced through the inlet duct 69, so as to supply fresh air to the vehicle interior. Meanwhile, air rushing through the exhaust duct 72 will set up a suction effect, causing air to be withdrawn from the vehicle interior through the outlet duct 71 and out the exhaust conduit. Therefore a continual circulation is set up within the vehicle, assuring the vehicle of fresh air and exhausting the vehicle of used air at the same time and all this can be accomplished without moving parts if desired, the parts 70, 75 being optional.

In the form of the invention illustrated in Fig. 2, the construction of air scoop, inlet and outlet ducts, and exhaust duct is the same as that described immediately above, this form of the invention differing only to the extent of providing a movable shield instead of a fixed shield 73. This movable shield or closure member is designated 76, and is positioned to close off from the air scoop either the outlet duct 71 or the exhaust duct 72.

Assuming that the member 76 is in the full line position illustrated, air will be scooped up by the intake 68, and will move through the main conduit 69 to the vehicle interior to supply said interior with fresh outside air. At the same time, air will be rushing through the exhaust duct 72. The opening 74 is constantly open, due to the position in which the member 76 is mounted, and accordingly, used air will be moved in the direction of the arrows through the secondary conduit 71, through the opening 74, and through the exhaust 72 to atmosphere.

The above position of the parts, as may be noted, is the same position of the parts illustrated in Fig. 1 and the action is the same.

However, in the form of Fig. 2 the member 76 can be adjusted to the dotted line position illustrated. When in this position, there is no exhaustion of air from within the vehicle. However, both the ducts 69 and 71 are in communication with the air scoop 68, so that air can be supplied through both of these ducts, thus to increase the amount of air supplied from outside to the vehicle interior.

In the form of the invention illustrated in Fig. 3, the air scoop 77 is in joint communication with the main conduit 78 and the exhaust conduit 79. Both of these conduits have a common opening communicating with the air scoop 77.

Mounted at the center of this opening is a spindle 80, that is mounted slightly in advance of the dividing wall between the conduits 78, 79. The spindle 80 has mounted thereon the closure member 81, and also the closure member 82, these being movably mounted upon the spindle and being normally retained in one position upon the spindle by means of springs. The members are operable by means of crank arms and rod, not shown, in the manner of the forms of the invention previously illustrated and described. Thus, on rotatable adjustment of the spindle 80 in one direction, members 81 and 82 are positioned as shown by full lines in Fig. 3. In this position of the parts, the exhaust duct 79 is open to the air scoop, but the main conduit 78 is closed. The opening defined between the spindle and the dividing wall of the conduits, however, is also open, and thus, the device operates to exhaust used air from within the vehicle. Said air moves in the direction of the arrows illustrated in the drawing, that is, air rushing through the conduit 79 sets up a suction effect, causing air to be exhausted from within the vehicle and to move through the conduit 78 and thence through the opening in back of the spindle 80.

If the spindle is rotatably adjusted to another position, the member 81 is moved to the dotted line position illustrated, in which position it closes the exhaust duct 79. Member 82 is moved to its dotted line position, closing the communicating opening between the conduits. As a result, the device is adjusted to a position in which fresh air scooped up by the intake 77 is forced through the main conduit 78 to the vehicle interior.

In the form of the invention illustrated in Fig. 4, the air scoop 83 is so located that the main and secondary conduits 84 and 85 have a common opening upon the air scoop. An exhaust duct 86, however, is in effect a lateral branch extending from the secondary conduit 85.

A closure member 87 is pivotally mounted at the center of the common opening, and when in one position, closes off all but the main conduit 84, thus to adjust the device to a position in which fresh air will be drawn into the vehicle interior. If, however, the member 87 is adjusted to the dotted line position illustrated, the device will have been adjusted to a position in which it will exhaust air from the vehicle interior only. This is by reason of the fact that I mount in the secondary conduit the inner duct or venturi 88, the inlet end of which extends across the opening between the air scoop and the duct 85. Said venturi is extended into the lateral branch 86. The other end of the venturi 88 is spaced from the wall of the branch 86 by means of a spider 89. Thus, when the member 87 is in the dotted line position illustrated, air will be forced through the venturi 88, setting up a suction effect within the exhaust duct 86 that will cause air to be moved through the secondary conduit 85 while preventing the admission of new air into the vehicle.

At the same time, it may be noted that when the member 87 is in its full line position, not only will fresh air be supplied to the vehicle interior, but at the same time, assuming that the exhaust duct 86 has its outlet end positioned outside thhe vehicle where a suction effect will be set up, air will be drawn from within the vehicle through the ducts 85 and 86 and to atmosphere.

What is claimed is:

A ventilating system for motor vehicles comprising an air scoop, an air inlet duct communicating with said air scoop and the interior of the vehicle, an air outlet duct extending from the interior of said vehicle in divergent relation to said inlet duct, a suction passage from said air scoop communicating with said outlet duct and diverging from said outlet duct and extending exteriorly of said vehicle rearwardly of said air scoop to withdraw stale air from the interior of the vehicle, said air scoop, inlet duct, outlet duct, and suction passage being coplanar, and said inlet duct, outlet duct, and suction passage being of substantially the same diameter and converging into said air scoop, a fixed baffle deflecting used air from said outlet to said suction passage, and valve means for selectively opening and closing both said inlet duct and said outlet duct, said air scoop having an outwardly flared mouth to provide a Venturi effect.

JOHN C. BACKE.

REFERENCES CITED

The following references are of record in the file of this patent:

UNITED STATES PATENTS

| Number | Name | Date |
|---|---|---|
| 252,673 | Jones | Jan. 24, 1882 |
| 735,823 | Roake | Aug. 11, 1903 |
| 992,956 | Greenburg | May 23, 1911 |
| 1,892,078 | Rodemich et al. | Dec. 27, 1932 |
| 1,956,123 | Givens | Apr. 24, 1934 |
| 1,982,747 | Kurth | Dec. 4, 1934 |
| 2,087,651 | Mygland | July 20, 1937 |
| 2,443,454 | Hennessy | June 15, 1948 |
| 2,523,104 | Emmert | Sept. 19, 1950 |

FOREIGN PATENTS

| Number | Country | Date |
|---|---|---|
| 106,292 | Germany | Nov. 7, 1899 |
| 342,217 | Germany | Oct. 14, 1921 |
| 616,300 | Germany | July 25, 1935 |
| 433,896 | Great Britain | Aug. 22, 1935 |
| 516,448 | Great Britain | Jan. 2, 1940 |